(12) United States Patent
Hentschel

(10) Patent No.: US 6,285,411 B1
(45) Date of Patent: Sep. 4, 2001

(54) CIRCUIT FOR VIDEO MOIRÉ REDUCTION

(75) Inventor: Christian Hentschel, Hawthorne, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 08/948,472

(22) Filed: Oct. 10, 1997

(51) Int. Cl.$^7$ ............... H04N 5/21; H04N 3/22; G06K 9/40; G09G 1/04
(52) U.S. Cl. ............ 348/607; 348/607; 348/618; 348/624; 348/806; 382/254; 315/382
(58) Field of Search ............. 348/607, 618, 348/619, 624, 674, 675, 678, 686, 806; 382/275, 274, 254, 169, 167; 315/382, 31; H40N 5/20, 5/21, 5/202, 5/205

(56) References Cited

U.S. PATENT DOCUMENTS

| | | | |
|---|---|---|---|
| 3,973,206 | * 8/1976 | Haselwood et al. | 324/78 |
| 4,410,841 | * 10/1983 | Dusard et al. | 315/382 |
| 4,908,581 | * 3/1990 | Honjo | 329/320 |
| 5,125,100 | * 6/1992 | Katznelson | 455/6.1 |
| 5,196,924 | * 3/1993 | Lumelsky et al. | 358/32 |
| 5,425,114 | * 6/1995 | Hamasaki et al. | 348/618 |
| 5,440,353 | * 8/1995 | Yamazaki et al. | 348/806 |
| 5,546,101 | * 8/1996 | Sugawara | 345/63 |
| 5,661,522 | * 8/1997 | Tomizuka | 348/262 |
| 5,689,311 | * 11/1997 | Lee | 348/674 |
| 5,691,821 | * 11/1997 | Hieda et al. | 358/445 |
| 5,729,297 | * 3/1998 | Kwon | 348/458 |
| 5,729,301 | * 3/1998 | Sluyterman | 348/607 |
| 5,747,933 | * 5/1998 | Beeteson et al. | 348/806 |
| 5,757,343 | * 5/1998 | Nagakubo | 345/63 |
| 5,764,216 | * 6/1998 | Tanaka et al. | 345/147 |
| 5,796,384 | * 8/1998 | Kim | 345/147 |
| 5,818,521 | * 10/1998 | Hieda | 348/222 |
| 5,848,181 | * 12/1998 | Ogata | 382/169 |

OTHER PUBLICATIONS

* cited by examiner

Primary Examiner—Reinhard J. Eisenzopf
Assistant Examiner—Paulos Natnael
(74) Attorney, Agent, or Firm—Laurie E. Gathman

(57) ABSTRACT

A method and device for reducing moiré by preventing the production of the second harmonic of the video signal Nyquist frequency. A nonlinear function is applied to one of a) a digital video signal having a nonlinearity between an electrical video signal and luminance, and b) an analog video signal to create an output signal having a linearity between the electrical signal and luminance. The output signal is displayed on a display having a linearity between the electrical signal and luminance.

12 Claims, 8 Drawing Sheets

CIRCUIT FOR VIDEO MOIRÉ REDUCTION

BACKGROUND OF THE INVENTION

1. Field of the Invention

The invention relates in general to video moiré reduction and in particular to a method and device for preventing the production of the second harmonic of the video signal Nyquist frequency.

2. Description of the Prior Art

Moiré is a common word for patterns which look like waves on water. An example in the real world is the interference between two fences on a bridge, but it is also easily shown with simple patterns. Moiré appears when two sampling processes don't match each other and there is no sufficient filtering (interpolation/decimation).

An analog low pass filter can be used to reduce the second harmonics, as shown in U.S Pat. No. 5,729,301 to Sluyterman, having a pass-band up to the Nyquist frequency and a stop-band before the second harmonic. The low pass filter in the '301 patent is placed after an inverse gamma function for linear (voltage proportional to luminance) signals, and after low pass filtering, the signal is converted back to the incoming nonlinear gamma characteristic. The second harmonic in this example is removed by the low pass filter. FIG. 2 shows an example of this placement of the analog low pass filter 2 in the prior art. If the low pass filter 2 is not present, then the nonlinear function 3a and the inverse nonlinear function 3b would merely operate to cancel each other's affects and the input video signal to the nonlinear function 3a would be equivalent to the displayed video signal and include all higher harmonics. This low pass filter 2 must be of a higher order especially when used for the high pixel frequencies of computer monitors. This low pass filter 2, however, is costly and reduces the sharpness of the picture.

Typically, alias frequencies appear when the repetition spectrum of the first carrier (the closest carrier to the baseband video signal) overlaps with the baseband. When the alias frequency occurs within the baseband bandwidth the moiré patterns caused are not removable without loss of signal information.

Aliasing also occurs when the horizontal pixel sampling frequency is close to the sampling frequency of the shadow mask as explained below. In this case the second harmonic of the video signal Nyquist frequency (half of the pixel sampling frequency) produces the most aliasing.

The shadow mask has a first horizontal sampling frequency. This first sampling frequency should not come close to the input video signal pixel frequency or higher harmonics of the video signal. However, it is common to use a shadow mask where its sampling frequency almost matches the pixel frequency of the graphics format. If an alternating pixel on/off pattern of the video signal is in the range of the Nyquist frequency of the shadow mask the second harmonic of the video signal produces aliasing.

This second harmonic, and even higher harmonics, is created when a nonlinear function is applied to the video signal. A nonlinear function typically occurs in the CRT gun itself and is known as the gamma characteristic. The gamma characteristic is precorrected for by the camera which applies a nonlinear inverse gamma function to the signal before transmission. This precorrection assures that the resulting luminance of the display has a linear relation to the scene luminance of the video signal. In the case of computer graphics, most graphics are generated with respect to the CRT characteristics. The gamma characteristic of a CRT is a power function between the electrical amplitude $U_{in}$ and the luminance L:

$$L = k(U_{in})^\gamma$$

The $\gamma$ value for TVT's is usually defined to be 2.2 but $\gamma$ is tube dependent and ranges from 2.2 to 2.5. The effect of a nonlinear process, such as the gamma characteristic of a CRT, is shown in FIGS. 1e–g by signal $s_g(n)$. For the normalized input amplitudes 0 and 1, the output signal is identical; therefore, bursts with amplitudes close to 0 and 1 will not change. But all other amplitudes are changed due to the gamma characteristic. This causes higher harmonics ($2f_0$, etc.), as shown in the spectrum $|S_g(f)|$ of FIG. 1g. The repetition frequency $f_s - 2f_0$ is a low alias frequency, created by the carrier $f_s$. For illustration purposes, a low pass filter applied to the signal shows how it can remove the signal frequency $f_0$ and the repetition frequency $f_s - f_0$, but not the alias frequency $f_s - 2f_0$. The output signal contains the DC level and the alias frequency. FIGS. 1a–d show the signal without application of a nonlinear function.

An analog low pass filter can be used to reduce the second harmonics, as shown in Ser. No. 08/707,452, now U.S. Pat. No. 5,729,301, March 1998 having a pass-band up to the Nyquist frequency and a stop-band before the second harmonic. The low pass filter in Ser. No. 08/707,452 now U.S. Pat. No. 5,729,301 issued March 1998 is placed after an inverse gamma function for linear (voltage proportional to luminance) signals, and after low pass filtering, the signal is converted back to the incoming nonlinear gamma characteristic. The second harmonic in this example is removed by the low pass filter. FIG. 2 shows an example of this placement of the analog low pass filter 2 in the prior art. If the low pass filter 2 is not present, then the nonlinear function 3a and the inverse non-linear function 3b would merely operate to cancel each other's affects and the input video signal to the nonlinear function 3a would be equivalent to the displayed video signal and include all higher harmonics. This low pass filter 2 must be of a higher order especially when used for the high pixel frequencies of computer monitors. This low pass filter 2, however, is costly and reduces the sharpness of the picture.

SUMMARY OF THE INVENTION

Accordingly, it is an object of the invention to prevent the creation of the second harmonic in critical video signals for moiré rather than mask the effects of the second harmonic after it is created.

It is another object of the invention to reduce moiré without requiring an expensive low pass filter of high order.

It is a further object of the invention to provide a method and device which corrects for the non-linear inverse gamma function at the camera end when the display is a linear display.

It is yet another object of the invention to reduce moiré without loss of resolution.

It is yet a further object of the invention to reduce moiré without loss of sharpness at pulses (single lines) or transition It is even another object of the invention to suppress aliasing in alternating pixel patterns.

It is even a further object of the invention to reduce moiré with a very small hardware expenditure.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention reference is made to the following drawings.

DETAILED DESCRIPTION OF THE PREFERRED EMBODIMENTS

FIG. 1 shows that low frequency aliasing can be due to nonlinear signal processing such as the gamma function in current CRT's. Assume the input frequency is slightly less than the Nyquist frequency ($f_0=0.47\ f_s$) (FIG. 1a). The shadow mask causes a sampled signal similar to that shown in FIG. 1b. FIG. 1c shows a low pass filtered sampled signal without the gamma function. As can be seen from FIG. 1c a DC value is obtained i.e. no second order harmonic. The spectrum of the sampled signal shown in FIG. 1d does not contain the second harmonic $2f_0$, therefore the second harmonic of the video signal Nyquist frequency does not interfere with the sampling frequency.

Figure 1A:
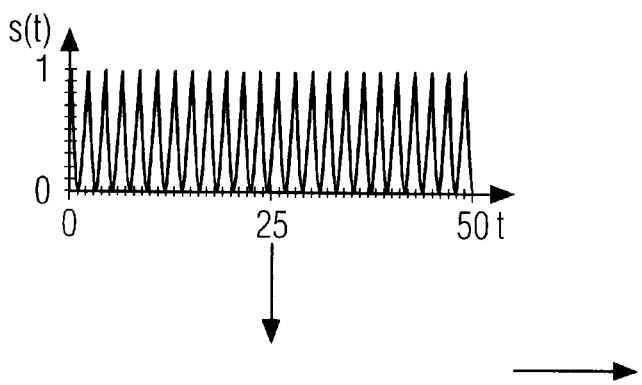
FIGS. 1a–g show the video signals with and without the application of a nonlinear function and the resulting signal spectrums.
Figure 1B:
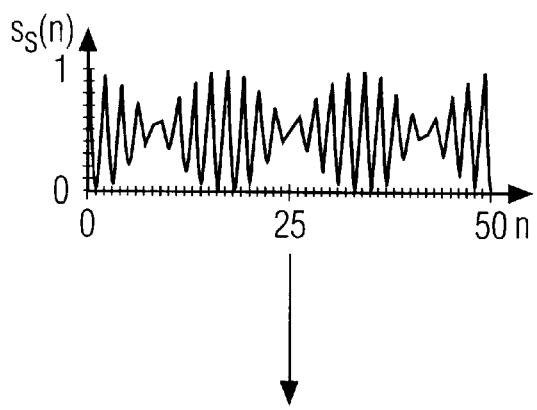
Figure 1C:
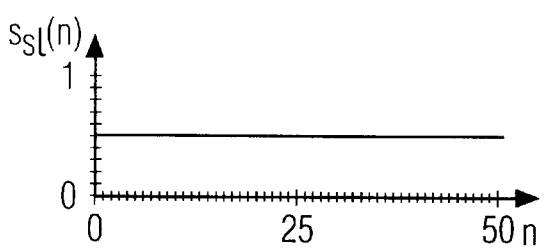
Figure 1D:
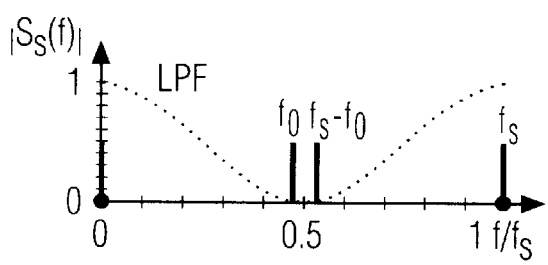
Figure 1E:
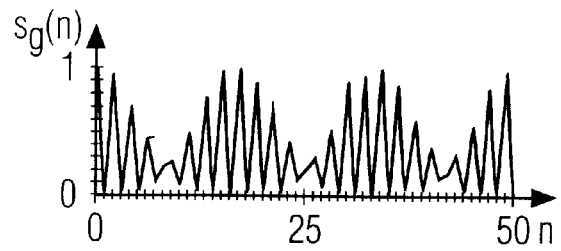
Figure 1F:
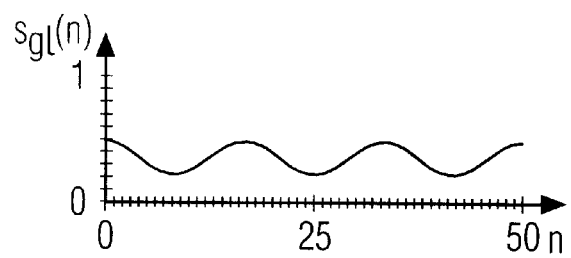

FIG. 1e shows the affect of the nonlinear gamma function on the video signal. After low pass filtering the signal in 1e, a sinusoidal waveform is seen, i.e. a second harmonic, which has a frequency of $f_s-2f_0$. It is the second harmonic frequency $2f_0$ which directly interferes with the sampling frequency $f_s$, causing the alias frequency $f_s-2f_0$.

Figure 2:
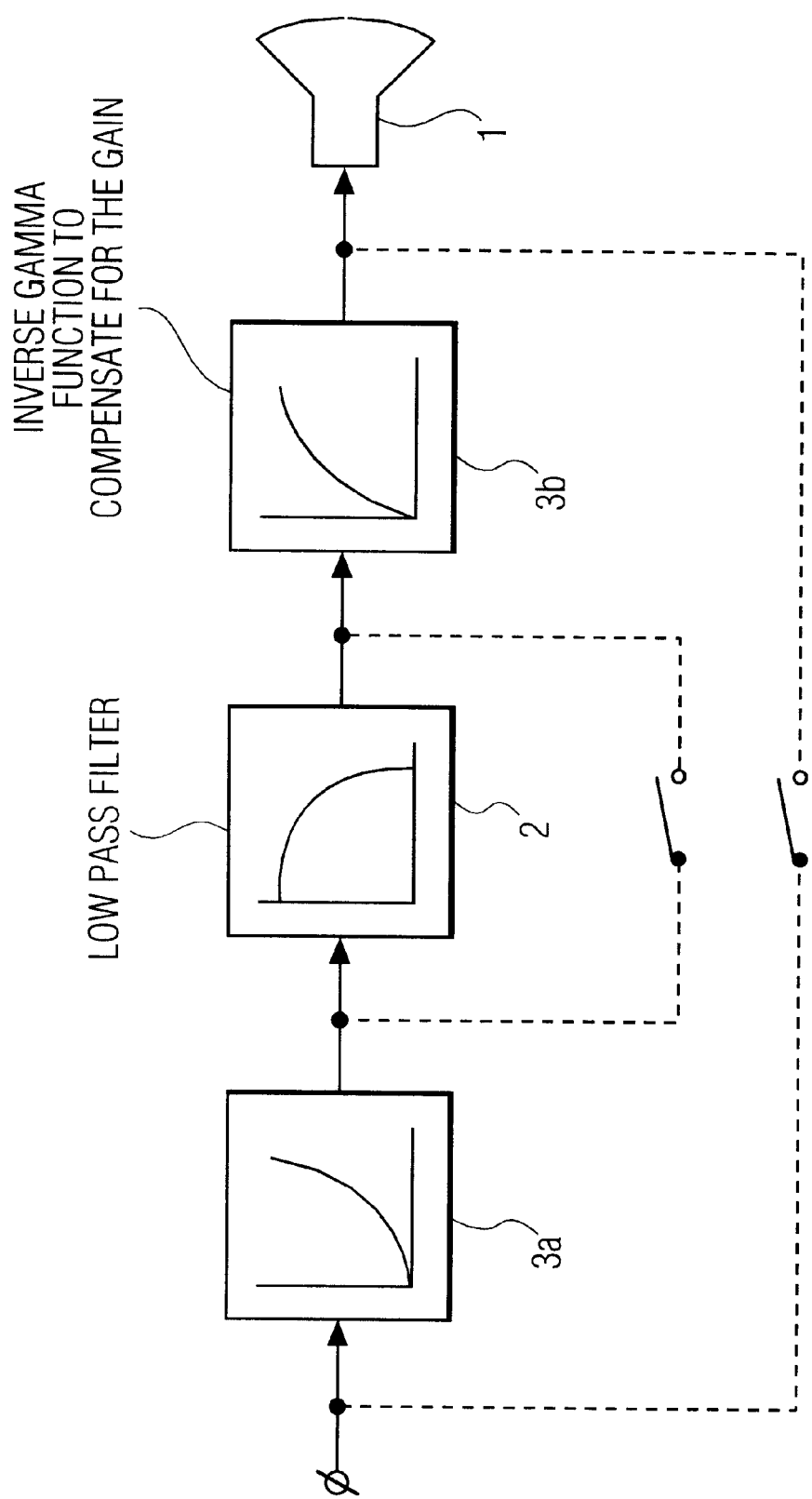
FIG. 2 shows a prior art system which uses a low pass filter to reduce moiré.
Figure 3A:
FIG. 3a shows the alternating amplitudes from pixel to pixel of the video signal.
Figure 3B:
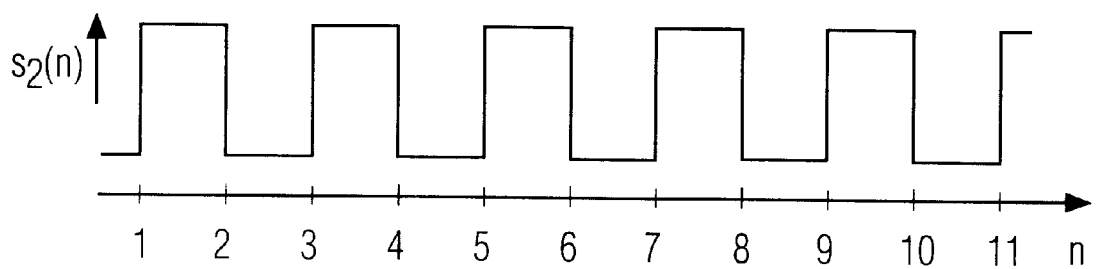
FIG. 3b shows the signal in 3a after D/A conversion.

FIG. 3a shows the alternating amplitudes from pixel to pixel of the video signal. This alternating signal contains the second and higher harmonics. After D/A conversion the signal looks as shown in FIG. 3b. There is no second or other even harmonic, so there is no need for a low pass filter to suppress the second harmonic. Once the analog signal of FIG. 3b is subjected to bandwidth limited signal processing, a nonlinear function such as the gamma function in the gun of the CRT will create the second harmonic causing aliasing. Typically when digital signals are being processed a low pass filter is placed immediately after the D/A converter, to suppress all frequencies above the video Nyquist frequency. This low pass filter causes the rectangular pattern shown in FIG. 3B to change to a more sinusoidal pattern with soft slopes, and any following nonlinear function would introduce the annoying second, and higher harmonics. Thus although the low pass filter in the analog domain, as used in FIG. 2, removes the second harmonic, in the digital domain when there is application of a D/A converter this low pass filter is unnecessary as long as the signal is made linear before application of the D/A conversion as explained below.

Figure 4:
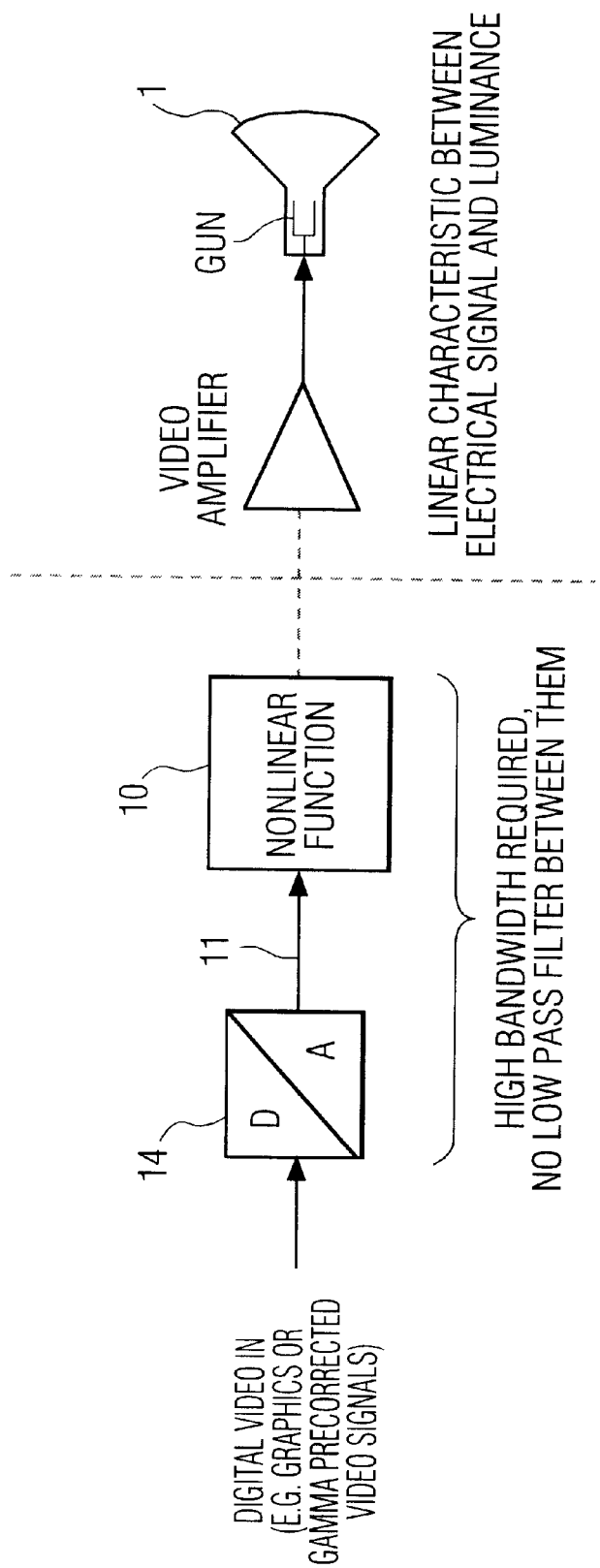
FIG. 4 shows an embodiment of the invention where the nonlinear function is placed directly after D/A conversion.

In FIG. 4, the nonlinear function is placed directly after the D/A converter without any filtering occurring therebetween. If both the D/A converter and the nonlinear function have a much higher bandwidth than the video Nyquist frequency, the rectangular pattern shown in FIG. 3b changes in amplitude, but not in shape (especially at the slopes). This means little second harmonic is produced. The nonlinear function which is used should compensate for a nonlinear amplitude behavior to achieve linearity (proportional behavior) between the electrical amplitude (voltage or current) and the luminance ($\Delta U\sim\Delta L$). The overall characteristic of the video amplifier and display device should be linear.

Figure 5:
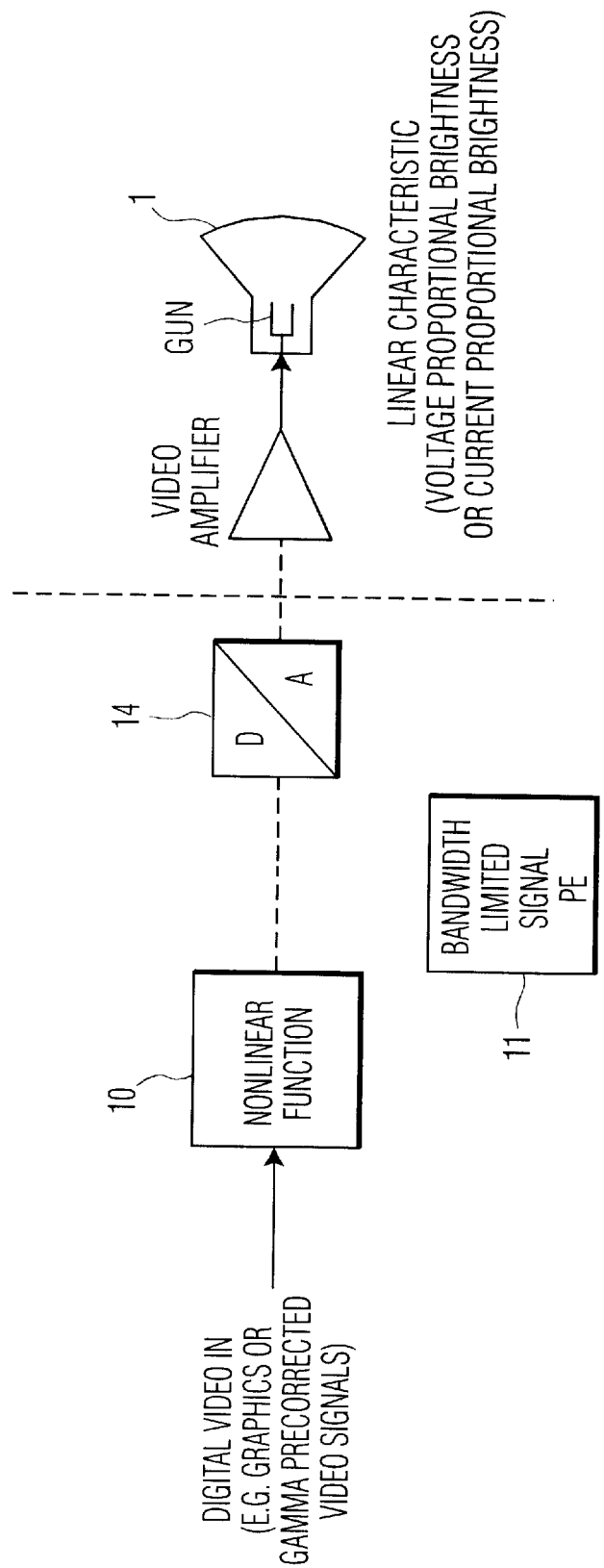
FIG. 5 shows another embodiment of the invention where the nonlinear function is placed before the D/A converter.

It is assumed that the camera (not shown) has an inverse non-linear function which is applied to the signal to correct for the non-linear function in the gun. (In the graphics domain it is assumed the software is designed for display with a nonlinear CRT). FIG. 5 shows a system in accordance with a first embodiment of the invention. It is assumed that the gun or display 1 is a linear display (e.g. the display does not exhibit a gamma characteristic). The signal, however, might be precorrected with the inverse nonlinear gamma function. Accordingly, a nonlinear function 10 is applied to the signal to remove the common precorrection at the camera. The nonlinear function 10 is applied in a way that at its output there is a linear correlation between the electrical signal (voltage or current)(e.g. the amplitude of the video signal) and the luminance seen on the display 1 ($\Delta U\sim\Delta L$). The signal is then D/A converted by D/A converter 14 before it reaches the gun 1. The D/A converter 14 with its pixel "sample and hold" function suppresses the second harmonic of an alternating on-off pattern. If there is no second harmonic there is reduced moiré. Filtering can occur after the D/A converter 14 because at this point there is already a linear relationship between the electrical signal and the luminance.

Figure 1G:
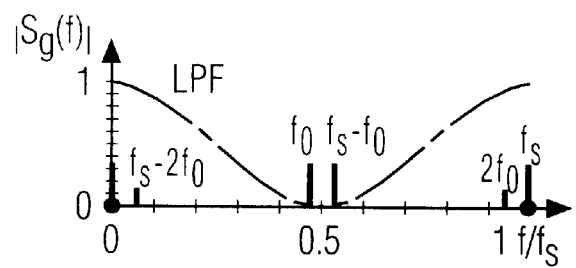

In an alternative embodiment of the invention as described above (FIG. 4) the D/A converter 14 is first applied to the digital video signal and the nonlinear function 10 is applied thereafter to the analog video signal. No filtering can take place before the nonlinear function 10, e.g. at point 11, because this filtering would soften the slopes of an alternating on-off pixel pattern, and a following nonlinear function would create a second harmonic as shown in FIG. 1g. Since there is no low pass filtering before the application of the nonlinear function 10 there is again no second harmonic created.

Figure 6:
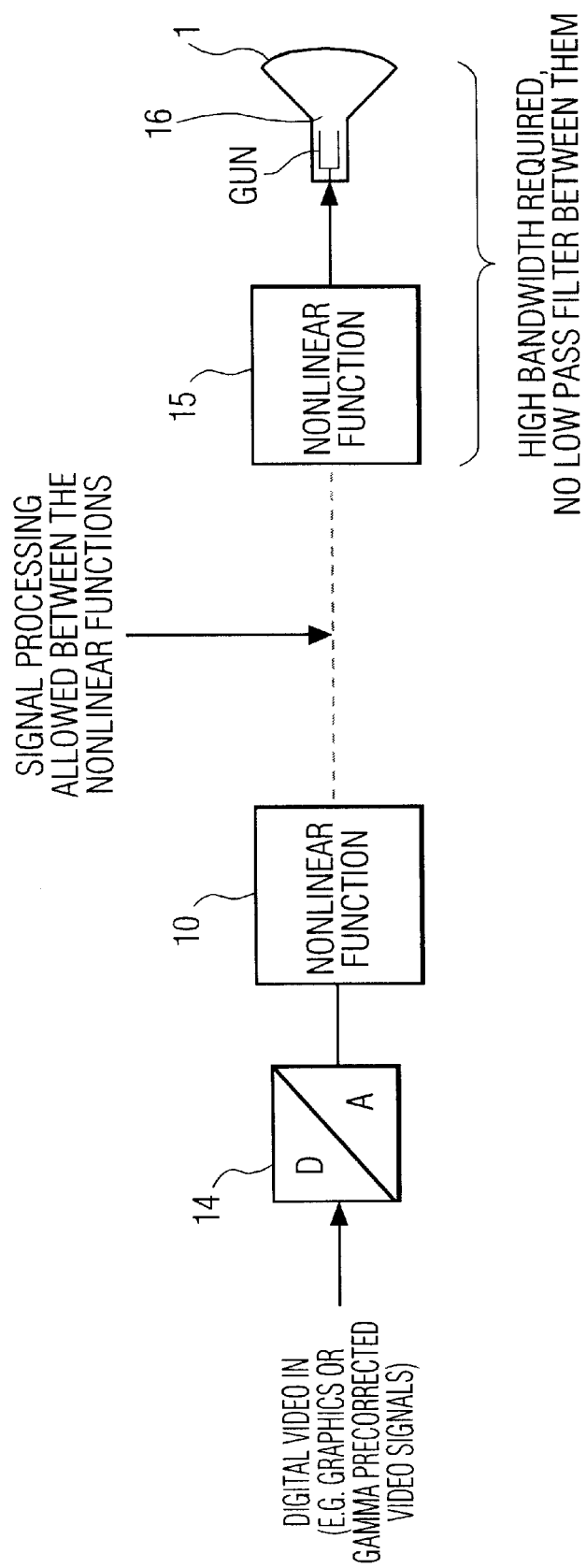
FIG. 6 shows yet another embodiment of the invention with a CRT having a γ characteristic.
Figure 7:
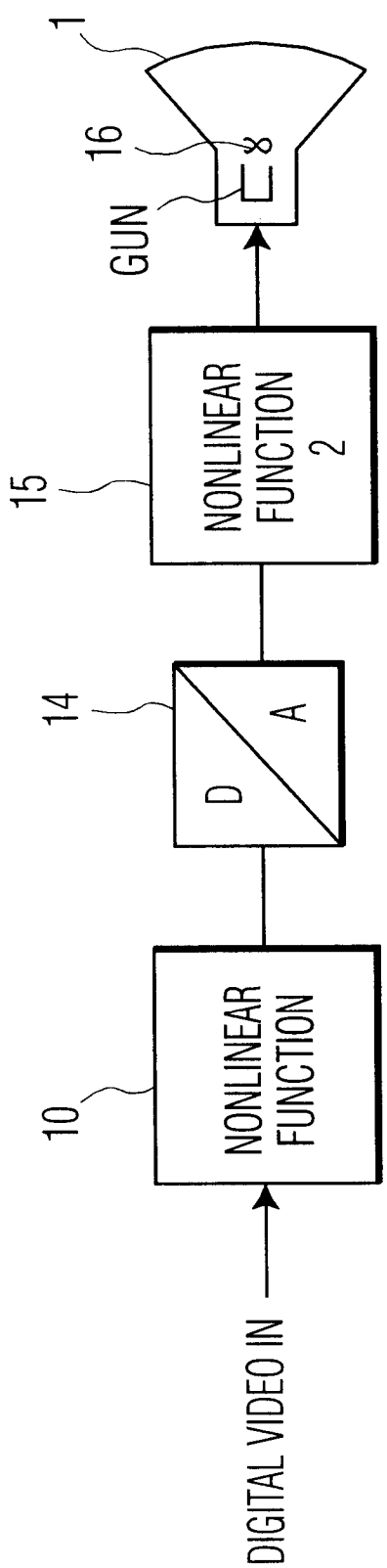
FIG. 7 shows yet another embodiment of the invention in which a first and second nonlinear function are applied to the video signal.

In yet another embodiment of the invention, it is assumed that the display exhibits a gamma characteristic with respect to an electrical signal and the luminance. FIG. 6 shows this embodiment of the invention. It is again assumed that the camera (not shown) applies an inverse gamma function to correct for the CRT. In this case the signal is either D/A converted 14 and then a first nonlinear function 10 is applied to correct for the precorrection at the camera as shown, or as in FIG. 5 a first nonlinear function 10 is applied to correct for the precorrection at the camera and then the video signal is D/A converted 14. A second inverse gamma function 15 is applied before the gun 1 to correct for the gun gamma function 16. Instead of this second inverse gamma function 15 correcting for the precorrection at the camera, it directly corrects for the gamma function 16 at the gun 1. Again it is important that there should be a large bandwidth between the nonlinear function 15 and the nonlinear function (y in the case of a CRT) 16 of the display device. If the electrical signal is not changed in shape between the two nonlinear functions (15 and 16) it prevents the introduction of even harmonics and the overall output is again a linear relationship between the electrical signal and luminance. If this signal is filtered, the nonlinear gun characteristic 16 will produce the second harmonic shown in FIG. 1g.

It should be noted that it is well known how to create the nonlinear functions. For example, they can be implemented in a simple look up table or by an analog circuit with a nonlinear characteristic.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. A circuit for moiré reduction for use with a digital video signal having a nonlinearity between its amplitude and its luminance, the circuit for use with a display which exhibits a linearity between the amplitude of the video signal and the luminance, comprising:
    a nonlinear function;
    a D/A converter for converting the digital video signal into an analog video signal; and
    wherein the nonlinear function is applied to one of a) the digital video signal, or b) the analog video signal, to create an output signal having a linearity between its amplitude and the luminance seen on the display.

2. A circuit as claimed in claim 1, wherein the nonlinear function is positioned to operate on the digital video signal before the D/A converter.

3. A circuit as claimed in claim 2, further including a bandwidth limited signal processing element and wherein the nonlinear function is applied to the digital video signal and the bandwidth limited signal processing element is positioned thereafter.

4. A circuit as claimed in claim 1, wherein the D/A converter converts the digital video signal into the analog video signal and the nonlinear function is applied after the D/A converter without any bandwidth limited signal processing element operating on the analog video signal before the application of the nonlinear function.

5. A circuit for moiré reduction for use with a digital video signal having a first nonlinearity between its amplitude and its luminance, the circuit for use with a display which exhibits a second nonlinearity between the amplitude of the video signal and the luminance, comprising:
    a first nonlinear function;
    a D/A converter for converting the digital video signal into an analog video signal;
    wherein the nonlinear function is applied to one of a) the digital video signal, or b) the analog video signal, to create an output signal having a linearity between its amplitude and its luminance; and
    a second nonlinear function applied to the analog video signal to compensate for the second nonlinearity of the display.

6. The circuit as claimed in claim 5, wherein the second nonlinearity of the display is defined as a gamma characteristic.

7. A method for reducing moiré for use with a digital video signal having a nonlinearity between its amplitude and its luminance, the method for use with a display which exhibits a linearity between the amplitude of the video signal and the luminance, comprising the steps of:
    applying a nonlinear function;
    D/A converting the digital video signal into an analog video signal; and
    wherein the step of applying the nonlinear function is applied to one of a) the digital video signal, or b) the analog video signal, to create an output signal having a linearity between its amplitude and its luminance.

8. A method for reducing moiré for use with a digital video signal having a first nonlinearity between its amplitude and its luminance, the method for use with a display having a second nonlinearity between the amplitude of the video signal and the luminance, comprising the steps of:
    applying a first nonlinear function;
    D/A converting the digital video signal into an analog video signal;
    wherein the step of applying the first nonlinear function applies the first nonlinear function to one of a) the digital video signal, or b) the analog video signal, to create an output signal having a linearity between its amplitude and its luminance; and
    applying a second nonlinear function to the video signal to compensate for the second nonlinearity of the display.

9. A display device which exhibits a first nonlinear characteristic between an amplitude of a video signal and its luminance, for use with a digital video signal having a second nonlinear characteristic between its amplitude and its luminance, comprising:
    a first nonlinear function;
    a D/A converter for converting the digital video signal into an analog signal;
    wherein the first nonlinear function is applied to the digital video signal, to create an output signal having a linearity between its amplitude and its luminance; and
    a second nonlinear function is applied to the analog video signal to compensate for the first nonlinear characteristic of the display.

10. A display device which exhibits a linear characteristic between an amplitude of a video signal and its luminance and for use with a digital video signal having a nonlinearity between its amplitude and its luminance, comprising:
    a nonlinear function;
    a D/A converter for converting the digital video signal into an analog video signal; and
    wherein the nonlinear function is applied to one of a) the digital video signal, or b) the analog video signal, to create an output signal having a linearity between its amplitude and its luminance.

11. The display device in accordance with claim 10, wherein the display device is an analog display device.

12. A display device which exhibits a first nonlinear characteristic between an amplitude of a video signal and its luminance, for use with a digital video signal having a second nonlinear characteristic between its amplitude and its luminance, comprising:
    a first nonlinear function;
    a D/A converter for converting the digital video signal into an analog signal;
    wherein the first nonlinear function is applied to the analog video signal, to create an output signal having a linearity between its amplitude and its luminance; and
    a second nonlinear function is applied to the output signal to compensate for the first nonlinear characteristic of the display.

* * * * *